US009671661B2

(12) United States Patent
Park et al.

(10) Patent No.: US 9,671,661 B2
(45) Date of Patent: Jun. 6, 2017

(54) LIQUID CRYSTAL DISPLAY

(71) Applicant: SAMSUNG DISPLAY CO., LTD., Yongin-si, Gyeonggi-do (KR)

(72) Inventors: Seung Hyun Park, Seoul (KR); Hyang Yul Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 21 days.

(21) Appl. No.: 14/563,770

(22) Filed: Dec. 8, 2014

(65) Prior Publication Data

US 2016/0011474 A1    Jan. 14, 2016

(30) Foreign Application Priority Data

Jul. 10, 2014   (KR) .................. 10-2014-0086817

(51) Int. Cl.
*G02F 1/1333* (2006.01)
*G02F 1/1362* (2006.01)
*G02F 1/1343* (2006.01)

(52) U.S. Cl.
CPC .. *G02F 1/136213* (2013.01); *G02F 1/134363* (2013.01); *G02F 2001/134372* (2013.01)

(58) Field of Classification Search
CPC ........... G02F 2001/13437; G02F 2001/134372
See application file for complete search history.

(56) References Cited

U.S. PATENT DOCUMENTS

| 6,781,657 B1* | 8/2004 | Kim ................. | G02F 1/134363 349/129 |
| 8,358,392 B2* | 1/2013 | Suzuki ............. | G02F 1/134363 349/110 |
| 8,760,595 B2* | 6/2014 | Choi ................. | G02F 1/136227 349/138 |
| 2009/0322975 A1* | 12/2009 | Song ................ | G02F 1/133707 349/46 |
| 2010/0141885 A1* | 6/2010 | Han ................. | G02F 1/134363 349/141 |
| 2010/0296040 A1* | 11/2010 | Han ................. | G02F 1/134363 349/139 |
| 2013/0063673 A1* | 3/2013 | Choi ................ | G02F 1/136227 349/43 |

(Continued)

FOREIGN PATENT DOCUMENTS

| KR | 10-2001-0090547 | 10/2001 |
| KR | 10-2004-0013599 | 2/2004 |

(Continued)

*Primary Examiner* — Phu Vu
(74) *Attorney, Agent, or Firm* — Innovation Counsel LLP

(57) ABSTRACT

A liquid crystal display includes a first substrate on which a plurality of gate lines and a plurality of data lines intersecting the gate lines are disposed, a second substrate facing the first substrate, a liquid crystal layer interposed between the first and second substrates, a linear electrode on the first substrate, a surface electrode on the first substrate, an insulating layer interposed between the linear electrode and the surface electrode, a thin film transistor electrically connected to the gate and data lines and electrically connected to the linear electrode, a black matrix disposed on any one of the first and second substrates and overlapping the gate and data lines, and a voltage storage electrode extending from one end portion of the linear electrode into the black matrix and overlapping the thin film transistor.

10 Claims, 6 Drawing Sheets

(56) References Cited

U.S. PATENT DOCUMENTS

2014/0092353 A1* 4/2014 Matsushima ..... G02F 1/133512
349/110
2014/0176894 A1* 6/2014 Park .................. G02F 1/134363
349/143

FOREIGN PATENT DOCUMENTS

| KR | 10-2007-0065465 | 6/2007 |
|----|-----------------|--------|
| KR | 10-2008-0000081 | 1/2008 |

\* cited by examiner

LIQUID CRYSTAL DISPLAY

CROSS-REFERENCE TO RELATED APPLICATION

This application claims priority to and the benefit of Korean Patent Application No. 10-2014-0086817, filed on Jul. 10, 2014, in the Korean Intellectual Property Office, the content of which is incorporated herein in its entirety by reference.

BACKGROUND

1. Field

Embodiments of the inventive concept relate to a liquid crystal display capable of reducing image sticking due to high kickback voltage generated in a high-resolution liquid crystal display.

2. Description of Related Technology

A liquid crystal display (LCD) is a type of flat panel displays (FPDs), which is the most widely used these days, and is configured such that a liquid crystal layer is interposed between two substrates having electrodes, so that liquid crystal molecules of the liquid crystal layer are rearranged upon applying voltage to the electrodes, thereby adjusting the amount of light transmitting through the liquid crystal layer.

A liquid crystal display (LCD) is slim but has a low side visibility compared to a front visibility. In order to overcome the disadvantage, many methods for arrangement of molecules in a liquid crystal and driving methods have been developed. In order to achieve wide viewing angle performance, studies on a plane to line switching (PLS) LCD in which a pixel electrode and a common electrode are formed on one substrate have been continuously carried out.

Especially, with increasing demands for high-resolution images, LCDs including pixels equal to or more than 500 PPI (pixels per inch) (that is, the LCDs in which approximately 500 or more pixels are included in an area of 1 inch wide by 1 inch high) have been continuously studied.

In the case of a high resolution LCD, as the number of pixels increases, the size of the pixel decreases and the area of a pixel electrode or a common electrode, which is included in the pixel, also decreases such that storage capacitance ($C_{st}$) is lowered.

Kickback voltage ($V_{kb}$) is particularly affected by the storage capacitance ($C_{st}$) and it is calculated using the following equation.

$$V_{kb} = \frac{C_{gs}}{C_{st} + C_{gs} + C_{lc}} V_p \qquad \text{[Equation 1]}$$

wherein $C_{gs}$ denotes parasitic capacitance between a gate electrode and a source electrode, $C_{lc}$ denotes a capacitance of a liquid crystal layer, and $V_p$ denotes a voltage applied to a pixel electrode.

When the storage capacitance ($C_{st}$) decreases, the kickback voltage ($V_{kb}$) increases and the high kickback voltage ($V_{kb}$) affects a pixel electrode or a common electrode in a pixel, thereby increasing voltage ripple, such that image sticking occurs on a screen and, thus, resolution is lowered.

In order to solve such problems, an insulating layer included in an LCD is formed to be thick, but the thick insulating layer causes the LCD to be also thicker.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY

Aspects of embodiments of the inventive concept are directed toward a liquid crystal display which is structured to lower kickback voltage by increasing storage capacitance and provide high resolution images.

According to an embodiment of the inventive concept, a liquid crystal display includes a first substrate on which a plurality of gate lines and a plurality of data lines intersecting the gate lines are disposed, a second substrate facing the first substrate, a liquid crystal layer interposed between the first and second substrates, a linear electrode on the first substrate, a surface electrode on the first substrate, an insulating layer interposed between the linear electrode and the surface electrode, a thin film transistor electrically connected to the gate and data lines and electrically connected to the linear electrode, a black matrix disposed on any one of the first and second substrates and overlapping the gate and data lines, and a voltage storage electrode extending from one end portion of the linear electrode into the black matrix and overlapping the thin film transistor.

The linear electrode and the voltage storage electrode may be a pixel electrode and the surface electrode may be a common electrode.

At least one linear electrode may be disposed between the data lines.

At least a portion of the voltage storage electrode may overlap the black matrix. The black matrix may desirably overlap the thin film transistor.

An area of the voltage storage electrode overlapping the black matrix may be larger than an area of the voltage storage electrode that does not overlap the black matrix.

According to embodiments of the inventive concept, a liquid crystal display includes a thin film transistor and an extended voltage storage electrode overlapping a black matrix so that storage capacitance increases and kickback voltage decreases, thereby reducing voltage ripple and image sticking and simultaneously achieving high resolution performance because an aperture ratio is not affected.

Further, according to embodiments of the inventive concept, a liquid crystal display has a small thickness because the thickness of an insulating layer is not required to be increased.

The foregoing summary is illustrative only and is not intended to be in any way limiting the claims of the inventive concept. In addition to the illustrative aspects, embodiments, and features described above, further aspects, embodiments, and features will become apparent by reference to the drawings and the following detailed description.

DETAILED DESCRIPTION

Figure 1:
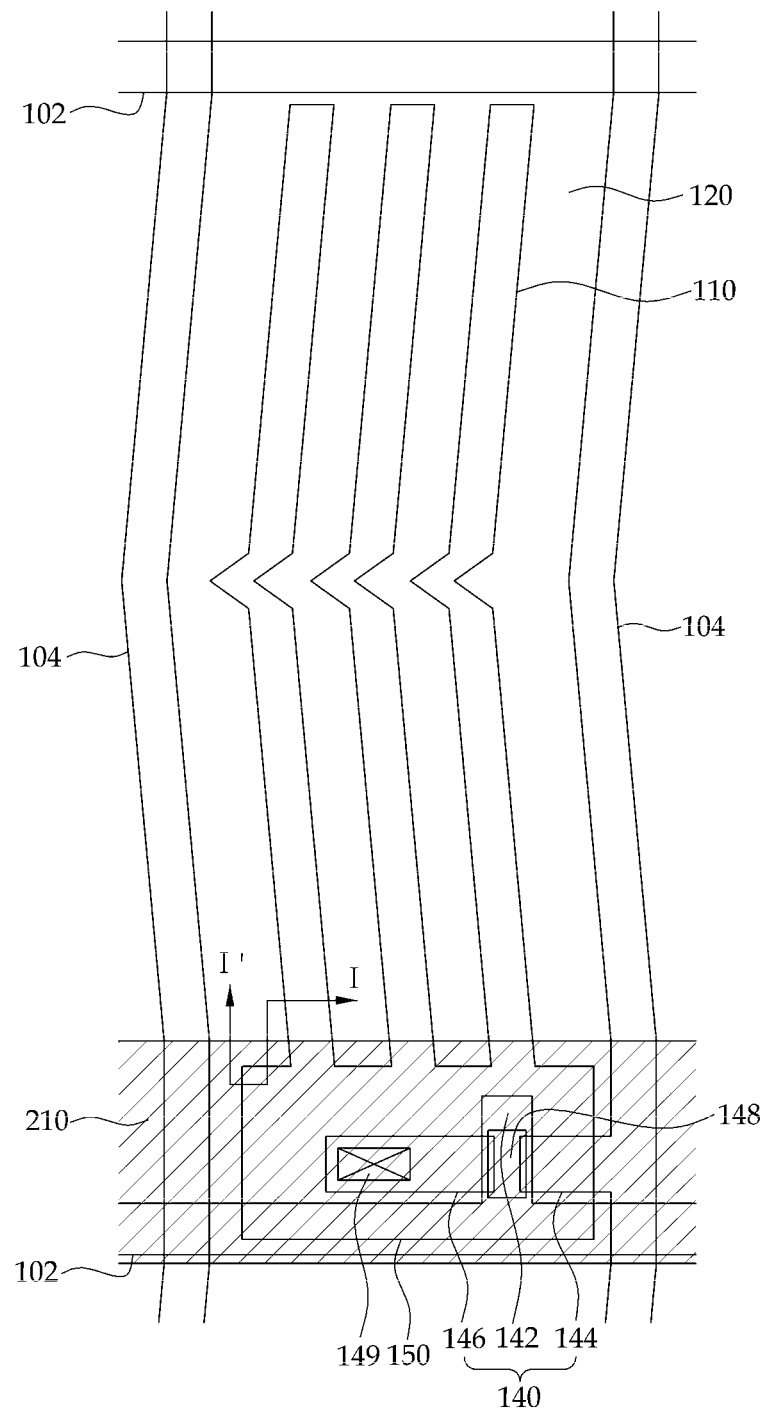
FIG. 1 is a plan view illustrating a liquid crystal display according to an embodiment of the inventive concept.

Advantages and features of structures formed in accordance with the present disclosure of the inventive concept and methods for achieving them will be made clear from embodiments described below in more detail with reference to the accompanying drawings. The present teachings may, however, be embodied in many different forms and should not be construed as being limited to the specific embodiments set forth herein. Rather, these embodiments are provided so that this disclosure will be thorough and complete, and will fully convey the scope of the present teachings to those skilled in the pertinent art. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not construed as limiting the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of mentioned component, step, operation and/or element, but do not exclude the presence or addition of one or more other components, steps, operations and/or elements.

Unless otherwise defined, all terms used herein (including technical and scientific terms) have the same meaning as commonly understood by those skilled in the art to which this disclosure of the inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
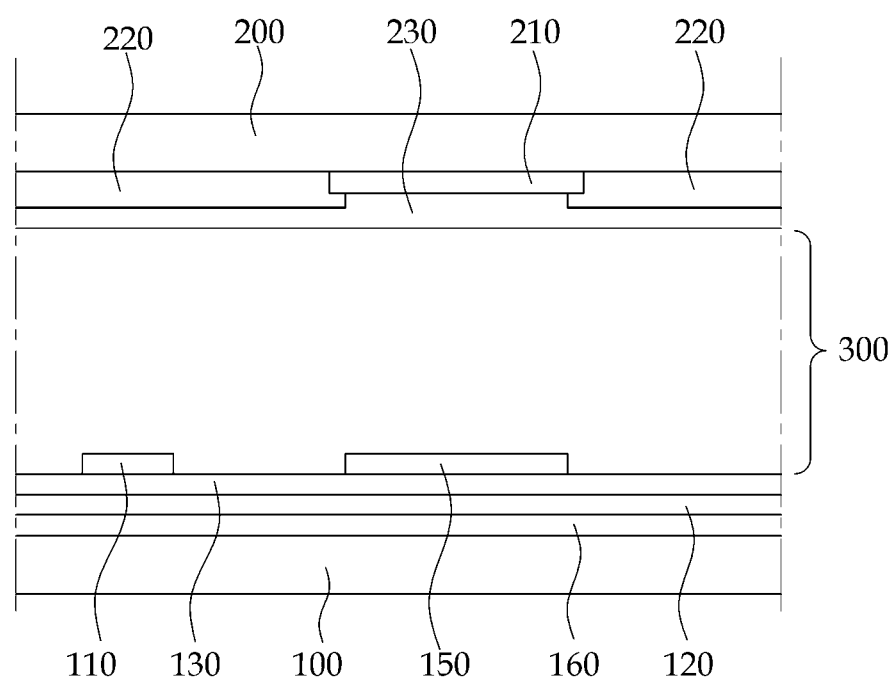
FIG. 2 is a cross-sectional view taken along line I-I' of FIG. 1.

Referring to FIGS. 1 and 2, a liquid crystal display (LCD) according to one embodiment includes a first substrate 100, a second substrate 200 facing the first substrate 100, a liquid crystal layer 300 interposed between the first and second substrates 100 and 200, a linear electrode and a surface electrode 110 and 120 on the first substrate 100, an insulating layer 130 interposed between the linear electrode and the surface electrode 110 and 120, a thin film transistor (TFT) 140 electrically connected to the linear electrode 110, a black matrix 210 disposed on any one of the first and second substrates 100 and 200, and a voltage storage electrode 150 extending from an end portion of the linear electrode 110 and overlapping the TFT 140.

The first and second substrates 100 and 200 may be made of transparent glass or plastic and a plurality of gate lines 102 and a plurality of data lines 104 intersecting (or crossing) the plurality of gate lines 102 may be disposed on the first substrate 100.

The gate line 102 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), or titanium (Ti).

The data line 104 may be bent at a region corresponding to a central portion of a pixel into a V-shape so as to achieve the maximum transmittance of the LCD, but embodiments of the present inventive concept are not limited thereto.

At least one linear electrode 110 may be disposed between adjacent data lines 104. According to one embodiment, a plurality of linear electrodes 110 are disposed between the adjacent data lines 104. The linear electrode 110 may be disposed substantially parallel to the data line 104 and may be bent at its central portion into a V-shape like the data line 104, but embodiments of the present inventive concept are not limited thereto and the linear electrode 110 may have a variety of shapes.

The surface electrode 120 may be in the form of a plate disposed on the substantially entire surface of the first substrate 100 or may be disposed to have an opening (not shown) in an area around a drain electrode 146 of the TFT 140, which will be described below.

The insulating layer 130 may be interposed between the linear electrode 110 and the surface electrode 120 and may be configured to insulate the linear electrode 110 from the surface electrode 120. The insulating layer 130 may be made of an organic or inorganic insulating material.

The TFT 140 may be electrically connected to the gate line 102 and the data line 104, which are disposed on the first substrate 100, and may be electrically connected to the linear electrode 110.

The TFT 140 may include a gate electrode 142 electrically connected to the gate line 102, a source electrode 144 electrically connected to the data line 104, and a drain electrode 146 electrically connected to the linear electrode 110 through a contact opening (e.g., hole) 149. A semiconductive channel 148 may be disposed between the source electrode 144 and the drain electrode 146.

The black matrix 210 may be disposed to overlap the gate line 102, the TFT 140 and the data line 104 and may reduce or prevent light leakage due to an electric field generated between the gate line 102 and the surface electrode 120 and between the data line 104 and the surface electrode 120.

In the case where the black matrix 210 is disposed on the second substrate 200, it may be disposed between color filters 220 and may be covered with a protective layer 230 made of an organic insulating material. However, embodiments of the present inventive concept are not limited thereto, and the black matrix 210 may be disposed on the first substrate 100.

The black matrix 210 illustrated in FIG. 1 is disposed along the gate line 102 and overlaps the gate line 102, the TFT 140 and data line 104. However, the black matrix 210 may also be disposed along the data line 104 and may overlap the gate line 102 and data line 104.

The voltage storage electrode 150 may have a predetermined size and may be integrally formed with the linear electrode 110 by extending from an end portion of the linear electrode 110 into the black matrix 210. The voltage storage electrode 150 may be disposed on the same layer as the linear electrode 110 and also may be made of the same material as the linear electrode 110.

In one embodiment, the linear electrode 110 and the voltage storage electrode 150 may act as a pixel electrode and the surface electrode 120 may act as a common electrode. In this case, a gate voltage input from an external driver circuit (not shown) through the gate line 102 may be input to the gate electrode 142 so that the semiconductive channel 148 may be activated and a channel layer is formed. Simultaneously, a data voltage input from the external driver circuit (not shown) through the data line 104 may be transmitted from the source electrode 144 to the drain electrode 146 through the channel layer. The pixel electrode may be electrically connected to the drain electrode 146 through the contact opening (e.g., hole) 149 so as to be applied with the data voltage, and the common electrode may be externally applied with a voltage at a predetermined level so as to form a parabola-shaped (parabolic) electric field between the pixel electrode and the common electrode.

The voltage storage electrode 150 may overlap the TFT 140 and may serve to form storage capacitance ($C_{st}$) in conjunction with the surface electrode 120 disposed in a TFT 140 region.

At least a portion of the voltage storage electrode 150 may overlap the black matrix 210 so that an aperture ratio may not be reduced. In this case, it is more preferable that the black matrix 210 overlaps the TFT 140 in order to achieve a high aperture ratio.

Figure 3:
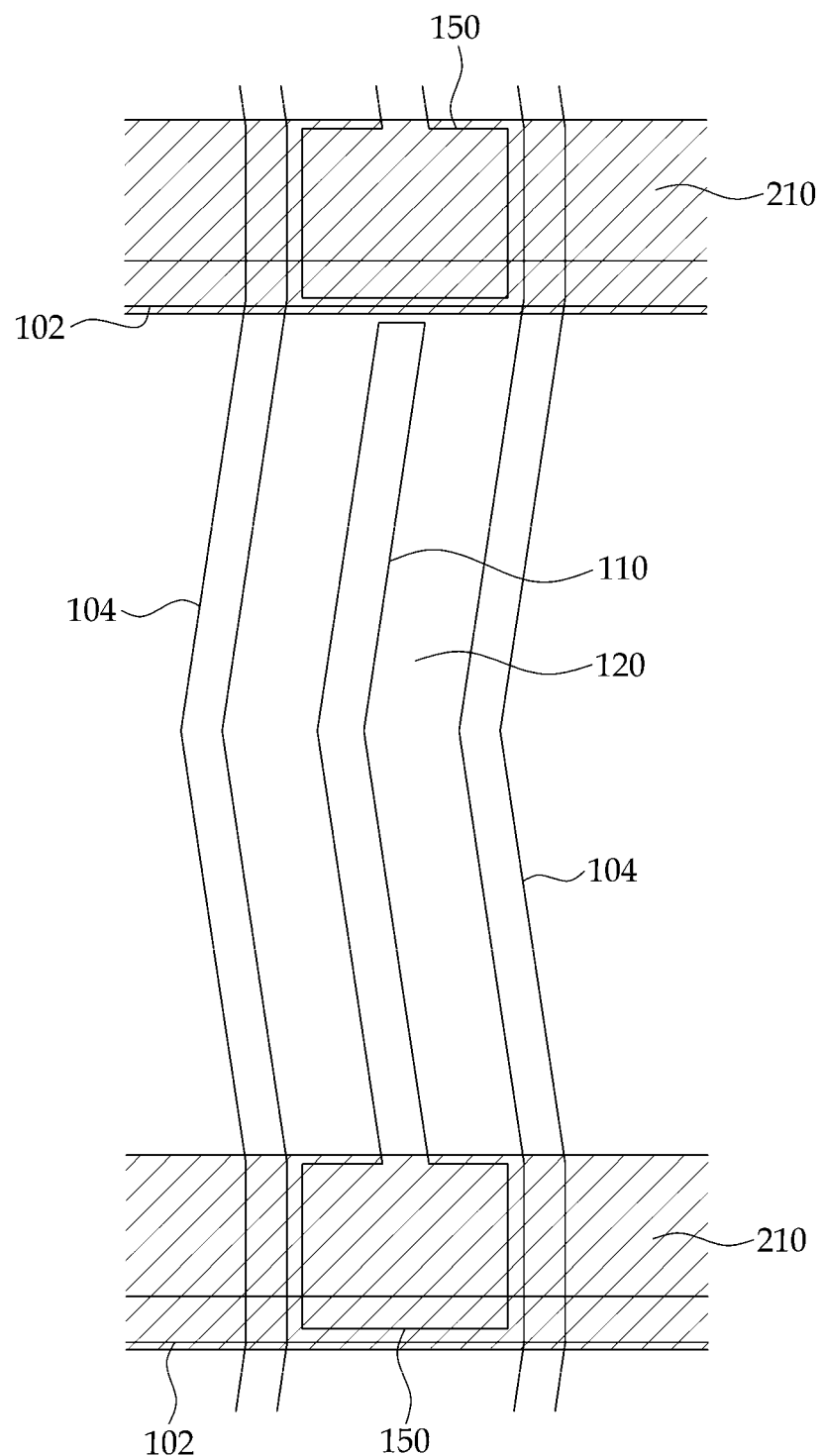
FIG. 3 is a plan view illustrating a liquid crystal display according to another embodiment.

Referring to FIG. 3, an LCD according to another embodiment may include one linear electrode 110 between the data lines 104. Except for the configuration of the linear electrode 110, the LCD illustrated in FIG. 3 may be identical to the LCD illustrated in FIG. 1. Therefore, detailed description of the same configuration will be omitted for brevity. Further, FIG. 3 does not illustrate the TFT 140 in order to simply show a relative location between the voltage storage electrode 150 and the black matrix 210.

The LCD according to another embodiment may include one linear electrode 110 between the data lines 104 and this is to maintain a distance between the linear electrodes 110 to reduce or prevent color mixture in a high resolution LCD.

In the high resolution LCD, as the distance between the data lines 104 decreases, the voltage storage electrode 150 may be disposed between the data lines 104 not to overlap the data lines 104, but embodiments of the present inventive concept are not limited thereto. The voltage storage electrode 150 may partly overlap the data lines 104.

Further, entire portion of the voltage storage electrode 150 may overlap the black matrix 210, but embodiments of the present inventive concept are not limited thereto. Part of the voltage storage electrode 150 may overlap the black matrix 210 and it will be described below with reference to FIGS. 4 to 6.

Figure 4:
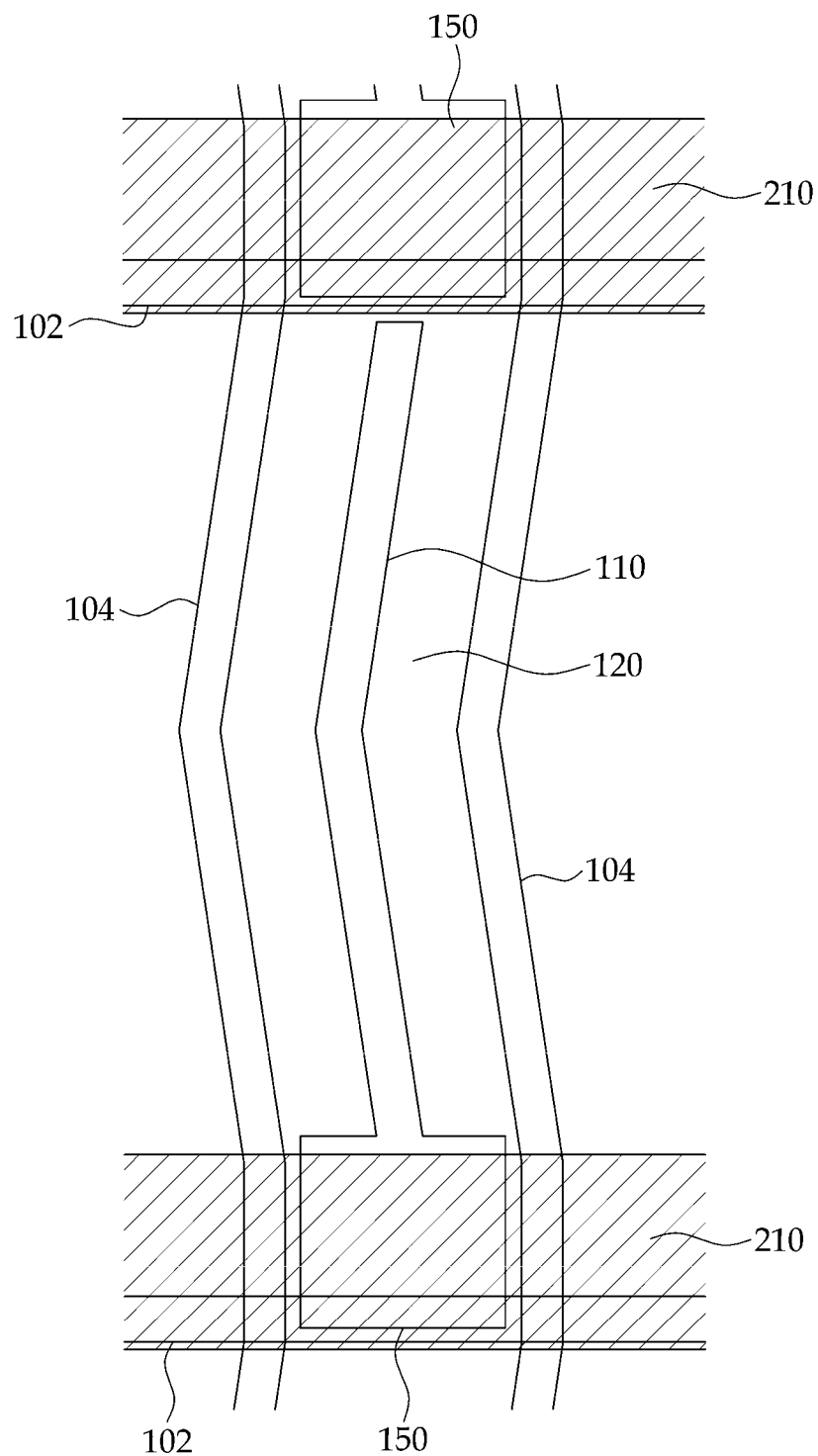
FIG. 4 is a plan view illustrating a liquid crystal display according to yet another embodiment.
Figure 5:
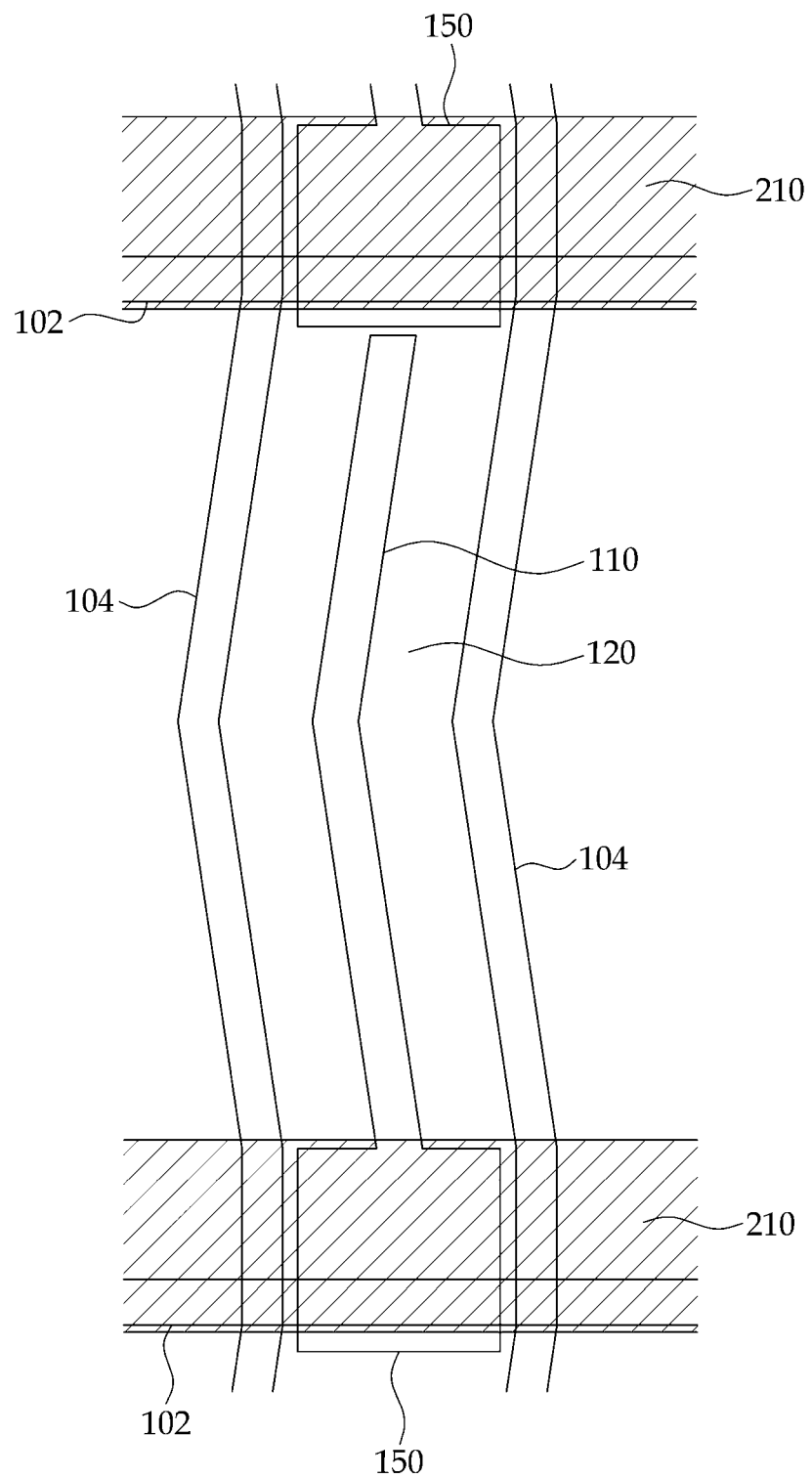
FIG. 5 is a plan view illustrating a liquid crystal display according to yet another embodiment.
Figure 6:
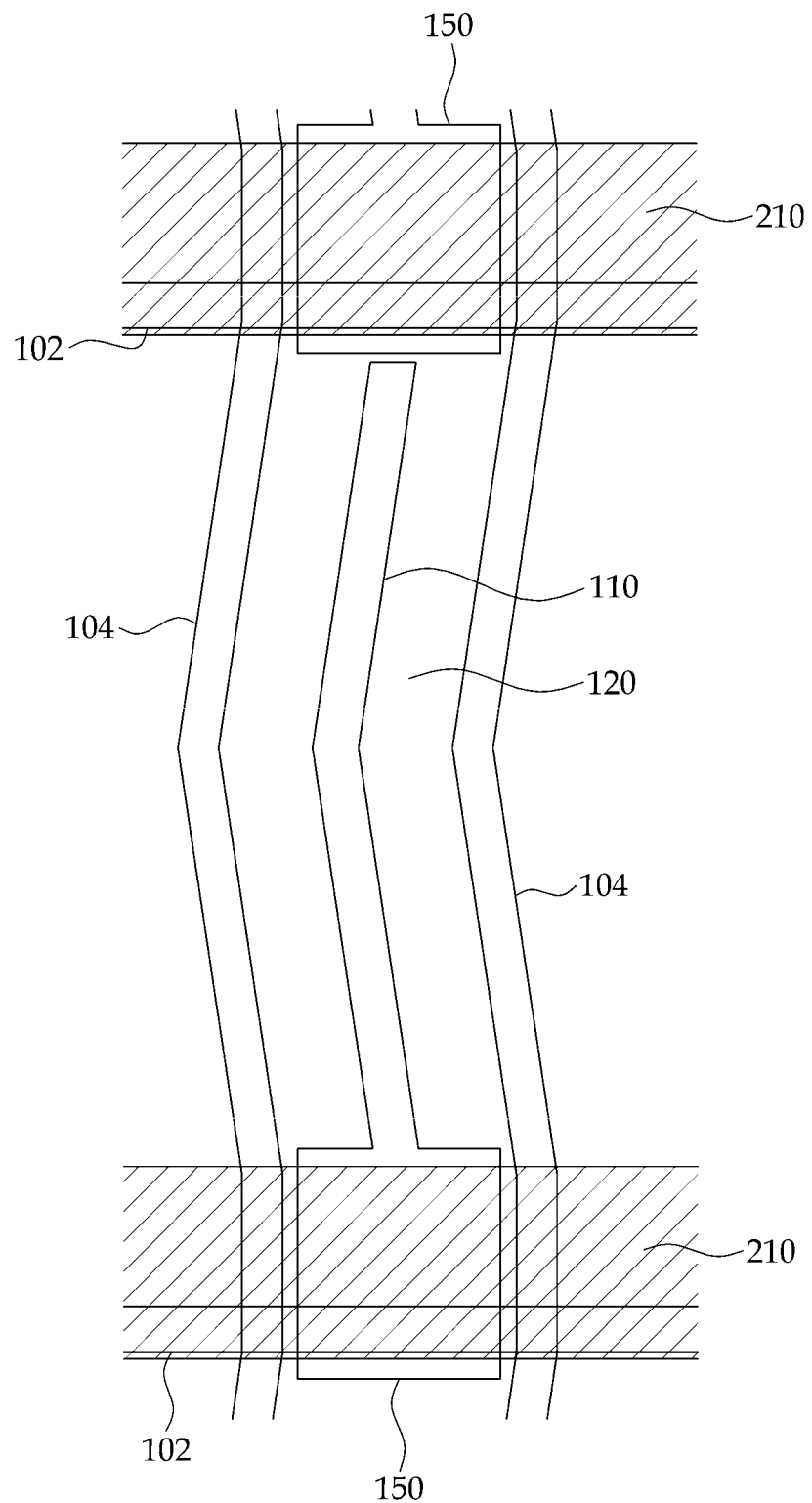
FIG. 6 is a plan view illustrating a liquid crystal display according to yet another embodiment.

Referring to FIGS. 4 to 6, LCDs according to yet another embodiment include one linear electrode 110 between the data lines 104 and include the voltage storage electrode 150 that is differently disposed as compared to the LCDs illustrated in FIGS. 1 and 3. Except for the configuration of the storage electrode 150, the LCDs illustrated in FIGS. 4 to 6 may be identical to the LCDs illustrated in FIGS. 1 and 3. Therefore, detailed description of the same configuration will be omitted for brevity.

Part of the voltage storage electrode 150 may overlap the black matrix 210. In this case, it is desirable that an area of the voltage storage electrode 150 overlapping the black matrix 210 is larger than an area of the voltage storage electrode 150 that does not overlap the black matrix 210 in order to form sufficient storage capacitance ($C_{st}$) together with the surface electrode 120.

From the foregoing, it will be appreciated that various embodiments of the inventive concept have been described herein for purposes of illustration, and that various modifications may be made without departing from the scope and spirit of the present disclosure. Accordingly, the various embodiments disclosed herein are not intended to limit the scope of the inventive concept, and the true scope and spirit of the inventive concept is indicated by the following claims, and equivalents thereof.

What is claimed is:

1. A liquid crystal display comprising:
   a first substrate on which a gate line and a data line intersecting the gate line are disposed;
   a second substrate facing the first substrate;
   a liquid crystal layer interposed between the first and the second substrates;
   a linear pixel electrode on the first substrate;
   a surface common electrode on the first substrate;
   an insulating layer interposed between the linear pixel electrode and the surface common electrode;
   a thin film transistor electrically connected to the gate line, and the data line and the linear pixel electrode;
   a black matrix disposed on any one of the first substrate and second substrate and overlapping the gate line and the data line; and
   a voltage storage electrode extending from one end portion of the linear pixel electrode into the black matrix and overlapping a channel region of the thin film transistor;
   wherein the voltage storage electrode is extended along the gate line with overlapping the surface common electrode;
   wherein the voltage storage electrode and the linear pixel electrode are unitary.

2. The liquid crystal display of claim 1, wherein the linear pixel electrode is disposed between adjacent data lines.

3. The liquid crystal display of claim 1, wherein at least a portion of the voltage storage electrode overlaps the black matrix.

4. The liquid crystal display of claim 3, wherein the black matrix overlaps the thin film transistor.

5. The liquid crystal display of claim 3, wherein an area of the voltage storage electrode overlapping the black matrix is larger than an area of the voltage storage electrode that does not overlap the black matrix.

6. The liquid crystal display of claim 1, wherein only one linear pixel electrode is disposed between adjacent data lines, and
   wherein the voltage storage electrode protrudes outside of the linear pixel electrode along a direction in which the gate line extends.

7. The liquid crystal display of claim 6, wherein the voltage storage electrode is partially covered by the black matrix.

8. The liquid crystal display of claim 7, wherein an area of the voltage storage electrode overlapping the black matrix is larger than an area of the voltage storage electrode that does not overlap the black matrix.

9. The liquid crystal display of claim 1, wherein the linear pixel electrode has a plurality of linear pixel electrodes electrically connected to the voltage storage electrode, and
wherein the voltage storage electrode protrudes outside of the plurality of linear pixel electrodes along a direction in which the gate line extends.

10. The liquid crystal display of claim 1, the surface common electrode applied with a predetermined voltage has a width wider than that of the linear pixel electrode.

\* \* \* \* \*